No. 642,808. Patented Feb. 6, 1900.
J. STUMPF.
VALVE.
(Application filed June 20, 1899.)
(No Model.)

Witnesses:
Chas. E. Gaylord,
Lute T. Alter

Inventor:
John Stumpf,
By Dyrenforth & Dyrenforth,
Attys.

UNITED STATES PATENT OFFICE.

JOHN STUMPF, OF BERLIN, GERMANY.

VALVE.

SPECIFICATION forming part of Letters Patent No. 642,808, dated February 6, 1900.

Application filed June 20, 1899. Serial No. 721,195. (No model.)

*To all whom it may concern:*

Be it known that I, JOHN STUMPF, a subject of the Emperor of Germany, residing at Berlin, Germany, have invented a new and useful Improvement in Valves, of which the following is a specification.

My invention relates to improvements in the construction of lift-valves generally and for general purposes, though my object is more especially to provide an improved lift-valve for pumps which will be quick closing and comparatively noiseless in action, will fit its seat closely to prevent leakage, and be durable and otherwise particularly desirable for its purpose.

The term "lift-valve" is employed herein to designate a valve of the class which in opening "lifts" from—that is to say, moves out of contact with—its seat, as distinguished from slide-valves, which move upon their seats to open and close, and the term "lift" in this sense is not limited to direction.

Figure 1:
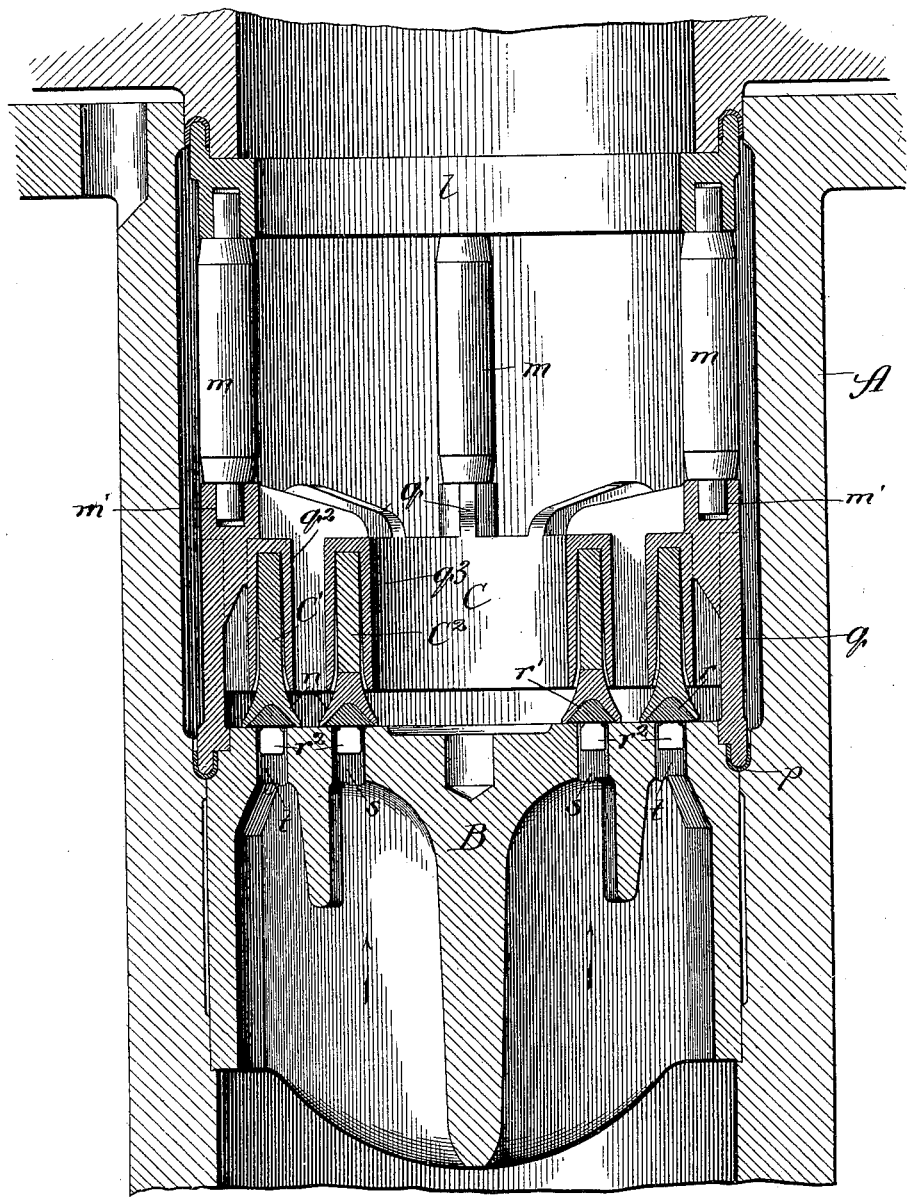
Figure 2:
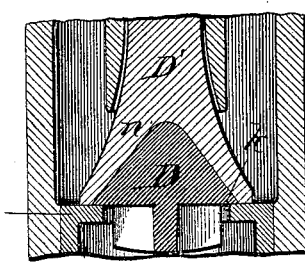

In the drawings, Figure 1 is a broken view showing in section a pump-valve chamber and valve-seat and a concentric ring valve of my improved construction, and Fig. 2 a broken section of a valve-casing and valve-seat and a disk valve constructed in accordance with my invention.

A is a valve chamber or casing forming part of a pump, and B a valve-seat suitably supported therein. In the construction shown in Fig. 1 the valve-seat B has two concentric annular or annular series of ports $t$ $s$, respectively, upon which annular rings $r$ $r'$ seat to close the ports. On the rings are guide-lugs $r^2$, which work in the ports $t$ $s$.

C is a valve-holder having an outer annular wall $q$, which rests around its lower edge upon the valve-seat B in an annular socket formed by the valve-seat and casing A, which may be provided with a gasket $p$.

The holder C may be a casting formed with ribs $q'$, which extend radially inward from the wall $q$ and carry annular concentric ring-pieces $q^2$ $q^3$, respectively, of inverted-U shape, as shown, to form retaining-sockets. In the sockets $q^2$ $q^3$ are annular concentric rings $C'$ $C^2$, of rubber, formed with bifurcated head portions $n$. The rings $C'$ $C^2$ rest loosely in the sockets $q^2$ $q^3$, and their bifurcated ends embrace the rings $r$ $r'$ and rest at their free edges normally against the surface of the valve-seat. The rings $r$ $r'$ may be of any suitable material. The valve-holder C may be held firmly in place by means of stay-rods $m$, entering sockets $m'$ in the wall $q$ and at their opposite ends fitting sockets in a ring $l$, confined in place in any suitable manner. Preferably the sockets $q^2$ $q^3$ are rendered slightly flaring, as shown, and the rubber rings $C'$ $C^2$ able to expand and contract more or less within the sockets.

Water flows in the direction indicated by the arrows, and under the pressure thereof as it passes through the ports $s$ $t$ the valve-rings $r$ $r'$ are lifted from the seat against the resistance of the rubber rings $C'$ $C^2$. In the reverse stroke of the pump-piston the consequent water-pressure above the valve-seat causes the rings to be pressed against the valve-seat surfaces, and at the same time the edges of the rubber rings are firmly pressed thereon at opposite sides of the rings to form a packing which will prevent leakage. The rings $C'$ $C^2$ are in effect rubber springs which permit the rings to lift from their seats under pressure from the ports $s$ $t$ and return the rings quickly to their seats when the pressure is relaxed. The edges or laps formed by the bifurcated heads $n$ operate as effective packings to produce complete closure.

Inasmuch as the laps of the rubber springs $C'$ $C^2$ may in practice be subject to more or less wear, it is advisable under certain conditions, as where the pump works upon sandy water and under high pressure, to form the head portions $n$ separate from the body portions of the rubber springs, as indicated with reference to the ring $C^2$. Thus when the laps have suffered too greatly from the closure, so that more or less leakage ensues, the lower parts or heads may be removed and replaced with new ones, whereas the body portions may continue in use.

In the construction shown in Fig. 2 a disk valve D closes a port $k$ in the valve-seat B, and the valve-closing rubber spring D', which may be tubular in cross-section, has a head $n$, forming a socket to fit over the valve D, whereby when the latter is seated the water-pressure above the seat will press the lower edges of the rubber spring against the seat to form a seal or packing.

While I prefer to construct my improvements as shown and described, they may be modified in the matters of details without departing from the spirit of my invention as defined by the claims.

What I claim as new, and desire to secure by Letters Patent, is—

1. The combination with a valve-seat and lift-valve, of a rubber valve-closing spring projecting over the valve to pack the seat when the valve is closed, substantially as and for the purpose set forth.

2. The combination with a valve-seat and lift-valve, of a stationary valve-spring holder adjacent to the valve, and a valve-closing rubber spring in said holder projecting over the valve to pack the seat when the valve is closed, substantially as and for the purpose set forth.

3. The combination with a valve-seat having an annular port, of a lifting ring valve seating upon said port, a valve-spring holder having a socket, and an annular valve-closing rubber spring in said socket engaging the valve and projecting over the same to pack the seat when the valve is closed, substantially as and for the purpose set forth.

4. The combination with a valve-seat having annular concentric ports, of a lift-valve for said ports comprising concentric rings, a valve-spring holder provided with concentric socket-pieces, and annular valve-closing rubber springs in said socket-pieces engaging the rings, substantially as and for the purpose set forth.

5. The combination with a valve-seat having annular concentric ports, of a lift-valve for said ports comprising concentric rings, a valve-spring holder provided with concentric socket-pieces, and annular valve-closing rubber springs in said socket-pieces engaging the rings and projecting over the same to pack the seat when the rings are seated, substantially as and for the purpose set forth.

6. The combination with a valve-seat and lift-valve, of a stationary valve-spring-holding socket-piece, and a rubber spring in said socket-piece having a body portion and separable valve-engaging head, substantially as and for the purpose set forth.

JOHN STUMPF.

In presence of—
WOLDEMAR HAUPT,
HENRY HASPER.